United States Patent
Tamura et al.

(10) Patent No.: US 10,573,883 B2
(45) Date of Patent: Feb. 25, 2020

(54) ELECTRODE FOR LITHIUM ION SECONDARY BATTERY, AND LITHIUM ION SECONDARY BATTERY

(71) Applicant: Envision AESC Japan Ltd., Kanagawa (JP)

(72) Inventors: Hidetoshi Tamura, Kanagawa (JP); Yuji Tanjo, Kanagawa (JP)

(73) Assignee: Envision AESC Japan Ltd., Kanagawa (JP)

( * ) Notice: Subject to any disclaimer, the term of this patent is extended or adjusted under 35 U.S.C. 154(b) by 152 days.

(21) Appl. No.: 15/841,548

(22) Filed: Dec. 14, 2017

(65) Prior Publication Data

US 2018/0183043 A1   Jun. 28, 2018

(30) Foreign Application Priority Data

Dec. 27, 2016   (JP) ................. 2016-252982

(51) Int. Cl.
*H01M 4/133* (2010.01)
*H01M 4/13* (2010.01)
(Continued)

(52) U.S. Cl.
CPC ........ *H01M 4/133* (2013.01); *H01M 4/0404* (2013.01); *H01M 4/131* (2013.01);
(Continued)

(58) Field of Classification Search
CPC .. H01M 4/133; H01M 4/413; H01M 10/0525; H01M 10/402; H01M 4/04
See application file for complete search history.

(56) References Cited

U.S. PATENT DOCUMENTS

2001/0014422 A1* 8/2001 Omaru ............... H01M 2/348
429/231.1
2002/0055041 A1* 5/2002 Kobayashi ............ H01M 4/13
429/221

(Continued)

FOREIGN PATENT DOCUMENTS

JP    2000-277095 A    10/2000
JP    2003-157829 A     5/2003
(Continued)

OTHER PUBLICATIONS

Machine Translation of: JP 2014-229554 A, Koyama et al., Dec. 8, 2014.*

(Continued)

*Primary Examiner* — Kenneth J Douyette
(74) *Attorney, Agent, or Firm* — Morgan, Lewis & Bockius LLP

(57) ABSTRACT

Provided is an electrode for a lithium ion secondary battery which includes an electrode current collector where an electrode active material mixture for a lithium ion secondary battery is disposed. The electrode active material mixture for a lithium ion secondary battery includes an electrode active material, a conductive agent containing carbon black, and a binder, and a maximum particle diameter ($D_{Max\_C}$) of the carbon black is smaller than a maximum particle diameter ($D_{Max\_E}$) of the electrode active material.

18 Claims, 1 Drawing Sheet

(51) Int. Cl.
*H01M 10/0525* (2010.01)
*H01M 4/131* (2010.01)
*H01M 10/052* (2010.01)
*H01M 4/04* (2006.01)
*H01M 4/36* (2006.01)
*H01M 4/62* (2006.01)

(52) U.S. Cl.
CPC ........... *H01M 4/364* (2013.01); *H01M 4/625* (2013.01); *H01M 10/052* (2013.01); *H01M 10/0525* (2013.01); *H01M 4/623* (2013.01); *Y02T 10/7011* (2013.01)

(56) References Cited

U.S. PATENT DOCUMENTS

| | | | |
|---|---|---|---|
| 2004/0101756 | A1 | 5/2004 | Koyama et al. |
| 2004/0131945 | A1* | 7/2004 | Zushi ................ H01M 10/0565 429/316 |
| 2009/0236564 | A1 | 9/2009 | Yasunaga et al. |
| 2009/0297952 | A1 | 12/2009 | Yasunaga et al. |
| 2014/0004415 | A1 | 1/2014 | Sawa et al. |

FOREIGN PATENT DOCUMENTS

| | | |
|---|---|---|
| JP | 2004-171901 A | 6/2004 |
| JP | 2004-311108 A | 11/2004 |
| JP | 2013-120710 A | 6/2013 |
| JP | 2014-093215 A | 5/2014 |
| JP | 2014-229554 A | 12/2014 |
| JP | 2016-153347 A | 8/2016 |
| KR | 2015-0050151 A | 5/2015 |

OTHER PUBLICATIONS

Extended European Search Report issued in corresponding European Patent Application No. 17208785.0 dated Mar. 26, 2018.
Office Action issued in corresponding Japanese Patent Application No. 2016-252982 dated Nov. 28, 2017.

* cited by examiner

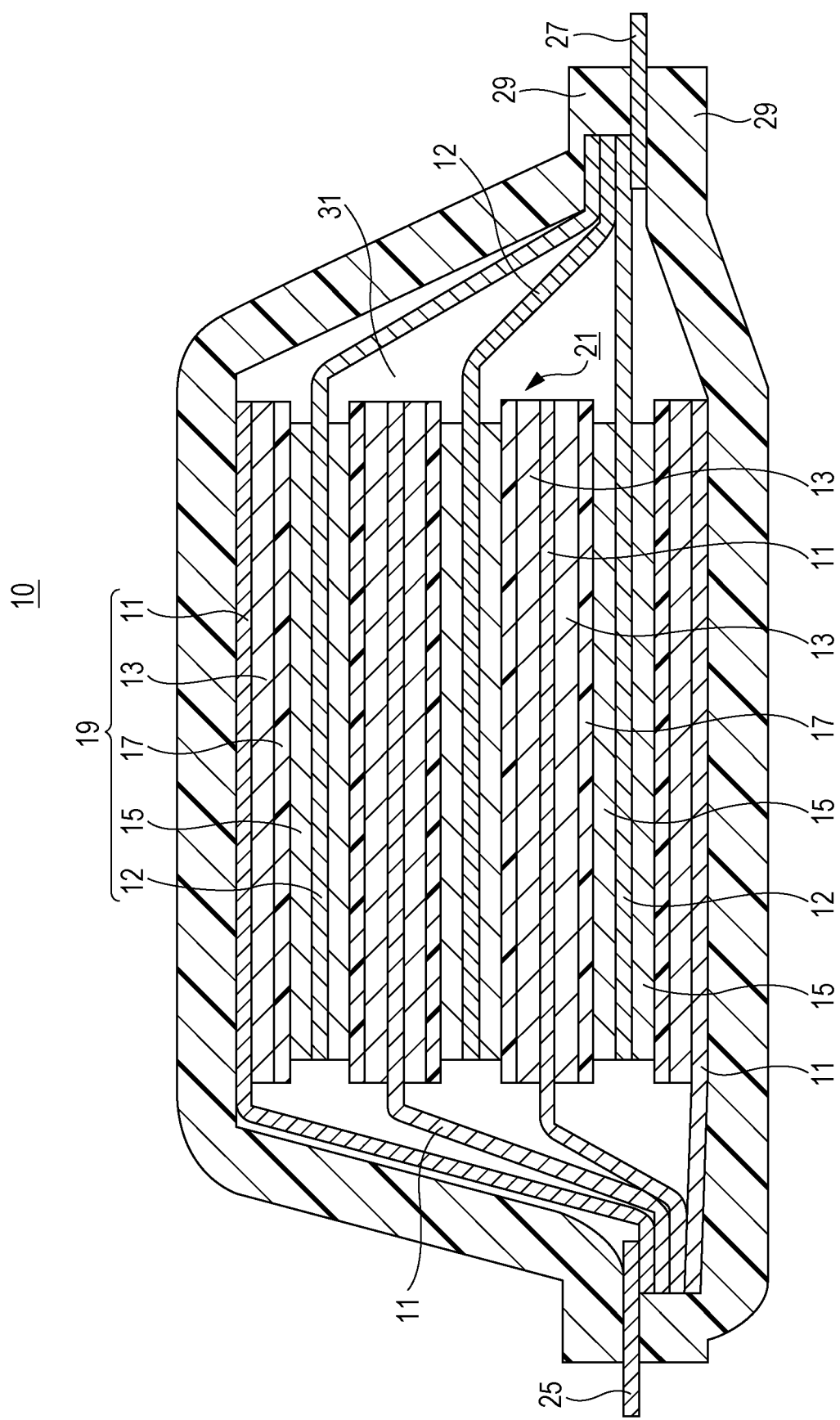

ELECTRODE FOR LITHIUM ION SECONDARY BATTERY, AND LITHIUM ION SECONDARY BATTERY

CROSS-REFERENCE TO RELATED APPLICATION

This application claims priority from Japanese Patent Application No. 2016-252982 filed with the Japan Patent Office on Dec. 27, 2016, the entire content of which is hereby incorporated by reference.

BACKGROUND

1. Technical Field

The present disclosure relates to an electrode used for a lithium ion secondary battery, and a lithium ion secondary battery.

2. Description of the Related Art

Nonaqueous electrolyte batteries have been put into practical use as batteries for automobiles including hybrid automobiles and electric automobiles. One example of such batteries for on-vehicle power sources is a lithium ion secondary battery. A lithium ion secondary battery is required to have various characteristics including the output characteristic, the energy density, the capacity, the lifetime, and the high-temperature stability. In order to improve the input/output characteristic of the battery in particular, various improvements for the electrode have been made.

For example, according to JP-A-2000-277095, a positive electrode active material layer is formed by mixing $LiCoO_2$ with an average particle diameter of 10 μm as a positive electrode active material, and graphite powder with an average particle diameter of 15 μm and acetylene black (carbon black) powder with an average particle diameter of 0.035 μm as a conductive agent.

SUMMARY

An electrode for a lithium ion secondary battery according to an embodiment of the present disclosure includes an electrode current collector where an electrode active material mixture for a lithium ion secondary battery is disposed. The electrode active material mixture for a lithium ion secondary battery includes an electrode active material, a conductive agent containing carbon black, and a binder, and a maximum particle diameter ($D_{Max\_C}$) of the carbon black is smaller than a maximum particle diameter ($D_{Max\_E}$) of the electrode active material.

BRIEF DESCRIPTION OF THE DRAWING

The FIGURE is a schematic sectional diagram illustrating a lithium ion secondary battery according to one embodiment of the present disclosure.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The commercial carbon black powder mainly includes fundamental particles with a microparticle shape, and primary aggregates of the fundamental particles. The primary aggregate is formed of the aggregated fundamental particles. The average particle diameter of carbon black can be calculated usually by observing the size of the fundamental particle component included in the aggregate with the use of an electron microscope. The development level of the aggregate formed of the aggregated fundamental particles is called a structure. The level is expressed by "high", "normal (middle)", or "low". It is known that the level of the structure of the carbon black has an influence on the strength, the viscosity, and the conductivity of the material to be mixed and on the dispersibility of the carbon black in the material. The carbon black powder may include, in addition to the fundamental particles and the aggregates, approximately several ppm to 10 ppm of giant particles with larger particle diameter than those of the fundamental particles and the aggregates. When the giant particles of the carbon black exist in an electrode active material mixture, such giant particles may form a groove in an electrode active material layer. That is to say, when the electrode active material mixture is applied on an electrode current collector, a groove may be formed in a part of the electrode active material layer where a linear mark is formed by the giant particles of the carbon black. The formation of such a groove in the electrode active material layer causes metal lithium to deposit locally in the groove, in which case dendrite may be generated. Moreover, when an electrolyte solution concentrates in the groove, the electrolyte solution may be deficient in other parts of the electrode active material layer. Furthermore, such a groove formed on the electrode active material layer may result in a problem of the poor appearance.

In view of the above, it is an object of the present disclosure to manufacture with a high yield, an electrode for a lithium ion secondary battery with improved performance, by adjusting the particle diameter of the electrode active material and the conductive agent.

An electrode for a lithium ion secondary battery in an embodiment of the present disclosure includes an electrode current collector where an electrode active material mixture for a lithium ion secondary battery is disposed. The electrode active material mixture includes an electrode active material, a conductive agent containing carbon black, and a binder. The maximum particle diameter ($D_{Max\_C}$) of the carbon black is smaller than the maximum particle diameter ($D_{Max\_E}$) of the electrode active material.

In the electrode active material mixture included in the electrode active material layer of the electrode for a lithium ion secondary battery according to the present disclosure, the giant particle as a foreign substance does not exist. For this reason, this electrode active material layer has a uniform surface structure and the improved performance. A lithium ion secondary battery including the electrode for a lithium ion secondary battery according to the present disclosure has the high capacity and the excellent cycle characteristics.

The embodiment of the present disclosure will be described below. In the lithium ion secondary battery according to the present embodiment, a power generating element including a positive electrode, a negative electrode, a separator, and an electrolyte solution is disposed in a package. Here, the electrode for a lithium ion secondary battery (hereinafter also referred to as "electrode" simply) refers to either a negative electrode or a positive electrode.

The positive electrode for a lithium ion secondary battery according to the embodiment corresponds to a battery member with a shape like a thin plate or a sheet, which includes a positive electrode active material layer. The positive electrode active material layer is formed by drying a mixture including a positive electrode active material, a binder, and if necessary, a conductive agent, which is applied or rolled on a positive electrode current collector formed of a metal foil or the like. The positive electrode active material layer preferably includes a lithium nickel composite oxide as the positive electrode active material. The lithium nickel composite oxide is a transition metal composite oxide containing lithium and nickel, and is expressed by a general formula $Li_xNi_yMe_{(1-y)}O_2$ (where Me is at least one or more metals selected from the group consisting of Li, Zr, Al, Mn, Na, Fe, Co, Cr, Cu, Zn, Ca, K, Mg, and Pb).

The positive electrode that can be employed in the present embodiment may be a positive electrode including a positive electrode active material layer including a positive electrode active material disposed on a positive electrode current collector. Preferably, the positive electrode includes a positive electrode active material layer to be described below. This positive electrode active material layer is obtained by drying a mixture including a positive electrode active material, a binder, and if necessary, a conductive agent, which is applied or rolled on a positive electrode current collector formed of a metal foil such as an aluminum foil. In each embodiment, the positive electrode active material layer preferably includes a lithium nickel composite oxide as the positive electrode active material.

The positive electrode active material layer may further include a lithium manganese composite oxide as the positive electrode active material. Examples of the lithium manganese composite oxide include spinel lithium manganate ($LiMn_2O_4$) and lithium manganate ($LiMnO_2$) with a zigzag layer structure. By using the lithium manganese composite oxide additionally, the positive electrode can be manufactured at lower cost. It is particularly preferable to use the spinel lithium manganate ($LiMn_2O_4$) whose crystal structure in the over-charged state has the excellent stability.

It is particularly preferable that the positive electrode active material layer includes as the positive electrode active material, a lithium nickel manganese cobalt composite oxide having a layered crystal structure expressed by a general formula $Li_xNi_yCo_zMn_{(1-y-z)}O_2$, where x satisfies the relation of 1≤x≤1.2, y and z are positive numerals satisfying the relation of y+z<1, and y is 0.4 or more. Containing more manganese makes it difficult to synthesize a composite oxide with a single phase. Therefore, the relation of 1−y−z≤0.3 is desirably satisfied. Moreover, containing more cobalt results in a higher cost and lower capacity. Therefore, the relations of z<y and z<1−y−z are desirably satisfied. To achieve a battery with high capacity, it is particularly preferable that the relations of y>1−y−z and y>z are satisfied.

Examples of the conductive agent to be used for the positive electrode active material layer include carbon fiber such as carbon nanofiber, carbon black such as acetylene black and Ketjen black, activated carbon, graphite, mesoporous carbon, fullerenes, carbon nanotube, and other carbon materials. Moreover, for the positive electrode active material layer, an electrode additive that is generally used for forming an electrode, such as thickener, dispersant, or stabilizer, can be used as appropriate. In the embodiment, the conductive agent is preferably carbon black. By changing the size of the fundamental particle or the primary aggregate as appropriate, the conductivity of the carbon black can be adjusted suitably. It is particularly preferable that the maximum particle diameter of the carbon black is smaller than the maximum particle diameter ($D_{Max\_E}$) of the aforementioned electrode active material. That is to say, preferably, the maximum particle diameter ($D_{Max\_C}$) of the carbon black is smaller than the maximum particle diameter ($D_{Max\_EC}$) of the positive electrode active material. If the maximum particle diameter ($D_{Max\_C}$) of the carbon black is smaller than the maximum particle diameter ($D_{Max\_EC}$) of the positive electrode active material, when the positive electrode active material mixture is applied on the positive electrode current collector with the use of a coater, the coater can smoothly move on the surface of the positive electrode current collector. This makes it possible to uniformly apply the positive electrode active material mixture. Thus, neither a linear mark nor a groove is formed on the surface, so that the uniform positive electrode active material layer is formed.

The conductive agent used for the positive electrode active material layer may include graphite particles in addition to the carbon black. In this case, the maximum particle diameters of the electrode active material, the graphite, and the carbon black preferably satisfy the relation of the electrode active material ($D_{Max\_E}$)>the graphite ($D_{Max\_G}$)>the carbon black ($D_{Max\_C}$). That is to say, the maximum particle diameters of the positive electrode active material, the graphite, and the carbon black preferably satisfy the relation of the positive electrode active material ($D_{Max\_EC}$)>the graphite ($D_{Max\_G}$)>the carbon black ($D_{Max\_C}$). When the maximum particle diameters of these components satisfy the above relation, the positive electrode active material mixture can be applied uniformly on the positive electrode current collector.

As described above, in general, the particle diameter of the carbon black refers to the particle diameter of the fundamental particle. The distribution of the particle diameters of the fundamental particles is usually approximately 0.1 μm to 1 μm. On the other hand, the primary aggregates including the aggregated fundamental particles have various sizes depending on the level of the structure. In general, the size of the aggregate of carbon black (stokes particle diameter) ranges from approximately 1 μm to 100 μm. Moreover, the giant particle that may be included by approximately several ppm to 10 ppm in the carbon black has a size of several hundreds of micrometers. Therefore, if the giant particle exists as a foreign substance in the carbon black, the maximum particle diameter of the carbon black in the present embodiment refers to the size of the giant particle. If the giant particle does not exist, the maximum particle diameter of the carbon black in the present embodiment refers to the size of the aggregate with the maximum stokes particle diameter among the aggregates. The maximum particle diameter of the carbon black can be adjusted as appropriate by using a classifier, a sieve, or a pulverizer with a built-in classifier.

Examples of the binder to be used for the positive electrode active material layer include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubbers such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

In the embodiment, the negative electrode is a negative electrode including a negative electrode active material layer containing a negative electrode active material, which is disposed on a negative electrode current collector. Specifically, the negative electrode corresponds to a battery member with a shape like a thin plate or a sheet, which includes a negative electrode active material layer. The negative electrode active material layer is formed by applying a mixture, which includes a negative electrode active material, a binder, and if necessary, a conductive agent, on a negative electrode current collector formed of a metal foil such as a copper foil. For the negative electrode active material, a carbon material is preferably used. As the carbon material, graphite, amorphous carbon, or a mixture thereof can be used. A graphite particle with a coating layer of amorphous carbon can also be used. Here, the term "graphite particle with a coating layer of amorphous carbon" refers to the graphite particle whose surface is coated with amorphous carbon. It is only necessary that a part of the surface of the graphite particle is coated with amorphous carbon. It is not required that the entire surface of the graphite particle is coated with amorphous carbon. Moreover, the term "coating layer" does not necessary mean the layer with the uniform thickness.

When the graphite used in each embodiment is contained in the negative electrode active material layer, the output of the battery can be improved even if the state of charge (SOC) of the battery is low, and this is advantageous. Graphite is the hexagonal crystal carbon material having the hexagonal-plate-like crystal structure, and is also referred to as black lead or the like. The shape of the graphite is preferably like a particle.

As the graphite, there are natural graphite and artificial graphite. Natural graphite is inexpensive and can be obtained in large quantity, and moreover has the stable structure and the excellent durability. Artificial graphite is the artificially produced graphite and has high purity because of hardly containing impurities such as allotropes. Therefore, artificial graphite has the low electric resistance. Either the natural graphite or the artificial graphite can be used suitably as the carbon material in the embodiment. It is particularly preferable to use the natural graphite with a coating layer of amorphous carbon or the artificial graphite with a coating layer of amorphous carbon.

The amorphous carbon used in each embodiment is the carbon material that is amorphous as a whole, having a structure including randomly networking microcrystals. Note that amorphous carbon may partially have a structure similar to that of graphite. Examples of the amorphous carbon include carbon black, coke, activated carbon, carbon fiber, hard carbon, soft carbon, and mesoporous carbon. The graphite particle with a coating layer of amorphous carbon used in the embodiment may be either a natural graphite particle with a coating layer of amorphous carbon or artificial graphite with a coating layer of amorphous carbon. When these are used as the carbon material of the negative electrode active material, the degradation of the electrolyte solution is suppressed and the negative electrode can have the higher durability. In addition, the gas generation in charging the battery is suppressed. For this reason, the durability of the battery itself is improved.

Here, in the case of using the artificial graphite as the graphite, the interlayer distance d value ($d_{002}$) is preferably 0.337 nm or more. The structure of the crystal of the artificial graphite is generally thinner than that of the natural graphite. The artificial graphite to be used for the negative electrode active material for a lithium ion secondary battery preferably has the interlayer distance at which the intercalation of lithium ions is possible. The interlayer distance at which the intercalation/deintercalation of lithium ions is possible can be estimated based on the d value ($d_{002}$). If the d value is 0.337 nm or more, the intercalation/deintercalation of lithium ions is possible.

It is preferable that the binder included in the negative electrode active material layer is aqueous binder. The binder plays the role of binding together the particles of the carbon material as the negative electrode active material, or binding together the negative electrode active material layer and the metal foil. Examples of the preferable aqueous binder include synthetic rubbers such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin. In particular, using SBR, CMC, and a mixture thereof as the aqueous binder can improve the adhesive power between the carbon materials.

Another example of the binder is polyvinylidene fluoride (PVDF). If PVDF is used as the binder, N-methylpyrrolidone (NMP) can be used as the solvent instead of water. In this case, the gas generation due to the remaining moisture can be suppressed. Other than PVDF, the binder may be fluorine resins such as polytetrafluoroethylene (PTFE) and polyvinyl fluoride (PVF), and conductive polymers such as polyanilines, polythiophenes, polyacetylenes, or polypyrroles.

The binder is contained preferably by approximately 4 to 7 wt % relative to the weight of the entire negative electrode active material layer. When the binder is contained in the above range, the binding power of the negative electrode material can be secured and the resistance of the negative electrode can be maintained low.

The negative electrode active material layer may include a conductive agent. Examples of the conductive agent include carbon fiber such as carbon nanofiber, carbon black such as acetylene black and Ketjen black, activated carbon, mesoporous carbon, fullerenes, carbon nanotube, and other carbon materials. In addition, the negative electrode active material layer may contain an electrode additive generally used for forming the electrode, such as thickener, dispersant, and stabilizer. In the embodiment, the carbon black is preferably used as the conductive agent. The conductivity of the carbon black can be adjusted suitably by changing the size of the fundamental particle or the primary aggregate as appropriate. It is particularly preferable that the maximum particle diameter ($D_{Max\_C}$) of the carbon black is smaller than the maximum particle diameter ($D_{Max\_E}$) of the aforementioned electrode active material. That is to say, the maximum particle diameter ($D_{Max\_C}$) of the carbon black is preferably smaller than the maximum particle diameter ($D_{Max\_EA}$) of the negative electrode active material. If the maximum particle diameter ($D_{Max\_C}$) of the carbon black is smaller than the maximum particle diameter ($D_{Max\_EA}$) of the negative electrode active material, when the negative electrode active material mixture is applied on the negative electrode current collector with the use of a coater, the coater can smoothly move on the surface of the negative electrode current collector. This makes it possible to uniformly apply the negative electrode active material mixture. Thus, neither a linear mark nor a groove is formed on the surface, so that the uniform negative electrode active material layer is formed.

The conductive agent used for the negative electrode active material layer may include graphite particles in addition to the carbon black. In this case, the maximum particle diameters of the electrode active material, the graphite, and the carbon black preferably satisfy the relation of the electrode active material ($D_{Max\_E}$)>the graphite ($D_{Max\_G}$)>the carbon black ($D_{Max\_C}$). That is to say, the maximum particle diameters of the negative electrode active material, the graphite, and the carbon black preferably satisfy the relation of the negative electrode active material ($D_{Max\_EA}$)>the graphite ($D_{Max\_G}$)>the carbon black ($D_{Max\_C}$). When the maximum particle diameters of these components satisfy the above relation, the negative electrode active material mixture can be applied uniformly on the negative electrode current collector.

In the manufacture of the negative electrode active material layer in the embodiment, first, slurry is formed by mixing the carbon material as the negative electrode active material, a binder, and a conductive agent in a solvent (such as water or N-methylpyrrolidone (hereinafter referred to as "NMP")) at an appropriate ratio. Next, this slurry is applied or rolled on a negative electrode current collector formed of a metal foil (such as a copper foil). Next, the solvent is evaporated from the slurry by heating. Thus, the negative electrode active material layer can be formed. On this occasion, preferably, the slurry is disposed so that the weight of the negative electrode active material layer after the evaporation of the solvent is 2.5 to 10 mg/cm$^2$ on each surface of the negative electrode current collector. The weight of the negative electrode active material layer on each surface of the negative electrode current collector can be adjusted by changing the concentration of the slurry, the amount and the thickness of the slurry, the heating time to evaporate the solvent, and the like as appropriate. When the weight of the negative electrode active material layer is small, the negative electrode can have lower resistance, which is preferable. However, it is very difficult to set the weight of the negative electrode active material layer on one surface to be 2.5 mg/cm$^2$. Thus, the weight of the negative electrode active material layer is preferably set in the range of 2.5 to 10 mg/cm$^2$ on each surface.

In the lithium ion secondary battery according to the embodiment, the separator is a film-shaped battery member. The separator secures the conductivity of lithium ions between the negative electrode and the positive electrode by separating the positive electrode and the negative electrode from each other. The separator used in the embodiment includes an olefin resin layer. The olefin resin layer is a layer containing polyolefin obtained by polymerizing or co-polymerizing α-olefin such as ethylene, propylene, butene, pentene, or hexene. In the embodiment, the olefin resin layer is preferably a layer with a structure having pores closed when the battery temperature is increased, that is, a layer containing the porous or microporous polyolefin. When the olefin resin layer has such a structure, even if the battery temperature should increase, the separator is closed (shutdown) to block the ion flow. To achieve the shutdown effect, it is particularly preferable to use the porous polyethylene film. The separator may have a heat-resistant microparticle layer. In this case, the heat-resistant microparticle layer provided to prevent the abnormal heat generation of the battery includes inorganic microparticles that can resist temperatures of 150° C. or more and are stable in the electrochemical reaction. Examples of the inorganic microparticles include inorganic oxide such as silica, alumina (α-alumina, β-alumina, and θ-alumina), iron oxide, titanium oxide, barium titanate, and zirconium oxide, and minerals such as boehmite, zeolite, apatite, kaolin, spinel, mica, and mullite. As described above, the ceramic separator including the heat-resistant resin layer can also be used.

In the lithium ion secondary battery according to the embodiment, the electrolyte solution is a solution with the electric conductivity that is obtained by dissolving the ionic substance in the solvent. In the embodiment, in particular, a nonaqueous electrolyte solution is used. The power generating element including the positive electrode, the negative electrode, the separator, and the electrolyte solution constitutes one unit of the main components of the battery. The power generating element usually includes the stack including the positive electrode and the negative electrode which are stacked on each other with the separator interposed therebetween and this stack is immersed in the electrolyte solution.

The electrolyte solution used in the embodiment according to the present specification is a nonaqueous electrolyte solution. A preferable example of the electrolyte solution is a mixture including: a linear carbonate such as dimethyl carbonate (hereinafter referred to as "DMC"), diethyl carbonate (hereinafter referred to as "DEC"), ethylmethyl carbonate (hereinafter referred to as "EMC"), di-n-propyl carbonate, di-i-propyl carbonate, di-n-butyl carbonate, di-isobutyl carbonate, or di-t-butyl carbonate; and a cyclic carbonate such as propylene carbonate (PC) or ethylene carbonate (hereinafter referred to as "EC"). The electrolyte solution is obtained by dissolving a lithium salt such as lithium hexafluorophosphate (LiPF$_6$), lithium tetrafluoroborate (LiBF$_4$), or lithium perchlorate (LiClO$_4$) in such a carbonate mixture.

The electrolyte solution contains PC and EC corresponding to the cyclic carbonate and DMC and EMC corresponding to the linear carbonate as the essential components. In particular, PC is the solvent with the low freezing point, and is necessary for improving the output when the battery has the low temperature. However, it is known that the compatibility between PC and the graphite used as the negative electrode is a little low. EC is the solvent with the high polarity and the high dielectric constant. Therefore, EC is necessary as the component of the electrolyte solution for a lithium ion secondary battery. However, EC has a high melting point (freezing point) and is solid at room temperature. Therefore, even if the mixed solvent containing EC and other solvent is used, EC may freeze and deposit at low temperature. DMC is the solvent with the high diffusion coefficient and the low viscosity. However, since DMC has the high melting point (freezing point), it may happen that the electrolyte solution containing DMC possibly freezes at low temperature. Like DMC, EMC is the solvent with the high diffusion coefficient and the low viscosity. In this manner, the components of the electrolyte solution have the different characteristics. In order to improve the output when the battery has the low temperature, it is important to consider the balance among these characteristics. By adjusting the ratio between the cyclic carbonate and the linear carbonate to be contained, the electrolyte solution having the low viscosity at room temperature and maintaining its property even at the low temperature can be obtained.

The electrolyte solution may contain the cyclic carbonate compound as the additive different from the electrolyte solution component. Examples of the cyclic carbonate used as the additive include vinylene carbonate (VC). A cyclic carbonate compound with a halogen may be used as the additive. These cyclic carbonates are the compounds that form a protective film for the positive electrode and the negative electrode in the process of charging and discharging the battery. In particular, the cyclic carbonate compound as the additive can prevent the sulfur-containing compound such as the disulfonic acid compound or the disulfonic acid ester compound from attacking the positive electrode active material containing the lithium nickel composite oxide.

Examples of the cyclic carbonate compounds with a halogen include fluoroethylene carbonate (FEC), difluoroethylene carbonate, trifluoroethylene carbonate, chloroethylene carbonate, dichloroethylene carbonate, and trichloroethylene carbonate. It is particularly preferable to use fluoroethylene carbonate as the cyclic carbonate compound with a halogen.

The electrolyte solution may further contain a disulfonic acid compound as the additive. The disulfonic acid compound is a compound having two sulfo groups in one molecule. The disulfonic acid compound incorporates a disulfonate compound corresponding to a salt formed by the sulfo group and the metal ion, and a disulfonic acid ester compound having the ester bond with the sulfo group. One or two of the sulfo groups of the disulfonic acid compound may form the salt with the metal ion or may be the ionized anion. Examples of the disulfonic acid compound include methanedisulfonic acid, 1,2-ethanedisulfonic acid, 1,3-propanedisulfonic acid, 1,4-butanedisulfonic acid, benzenedisulfonic acid, naphthalenedisulfonic acid, biphenyldisulfonic acid, salts thereof (such as lithium methanedisulfonate and lithium 1,3-ethanedisulfonate), and anions thereof (such as methanedisulfonic acid anion and 1,3-ethanedisulfonic acid anion). Other examples of the disulfonic acid compound include a disulfonic acid ester compound. Examples of the suitably used disulfonic acid ester include linear disulfonic acid esters of alkyl diester and aryl diester, such as methanedisulfonic acid, 1,2-ethanedisulfonic acid, 1,3-propanedisulfonic acid, 1,4-butanedisulfonic acid, benzenedisulfonic acid, naphthalenedisulfonic acid, and biphenyldisulfonic acid, and cyclic disulfonic acid esters such as methylene methanedisulfonate ester, ethylene methanedisulfonate ester, and propylene methanedisulfonate ester. Methylene methanedisulfonate ester (hereinafter referred to as "MMDS") is particularly preferable.

The lithium ion secondary battery according to the embodiment includes the power generating element disposed in the package. Preferably, the power generating element is disposed in the sealed package. The term "sealing" means that the power generating element is covered with the package material so that the power generating element is not exposed to the external air. That is to say, the package has a bag-like shape that can be sealed in a state that the power generating element is disposed on the inside. As the package material, an aluminum laminate can be used.

Here, a structure example of the lithium ion secondary battery according to the embodiment is illustrated in the FIGURE. As illustrated in the FIGURE, a lithium ion secondary battery 10 includes, as main components, negative electrode current collectors 11, negative electrode active material layers 13, separators 17, positive electrode current collectors 12, and positive electrode active material layers 15. Here, the negative electrode current collector 11 and the positive electrode current collector 12 each have a rectangular thin-plate or sheet shape. In the FIGURE, the negative electrode active material layer 13 is disposed on each of opposite surfaces of the negative electrode current collector 11, and the positive electrode active material layer 15 is disposed on each of opposite surfaces of the positive electrode current collector 12. Alternatively, the active material layer can be disposed on only one surface of each current collector. The negative electrode current collector 11, the positive electrode current collector 12, the negative electrode active material layer 13, the positive electrode active material layer 15, and the separator 17 constitute one battery unit, i.e., the power generating element (a unit cell 19 in the FIGURE). A plurality of such unit cells 19 is stacked with the separator 17 interposed therebetween. Extension portions extending from the negative electrode current collectors 11 are collected and bonded onto a negative electrode lead 25. Extension portions extending from the positive electrode current collectors 12 are collected and bonded onto a positive electrode lead 27. The positive electrode lead is preferably an aluminum plate and the negative electrode lead is preferably a copper plate. These leads may be other metal (such as nickel, tin, or solder) or may be partly coated with a polymer material. The positive electrode lead and the negative electrode lead are welded to the positive electrode and the negative electrode, respectively. The battery including the stacked unit cells is covered with a package 29 so that the welded negative electrode lead 25 and positive electrode lead 27 are led to the outside. An electrolyte solution 31 is poured into the package 29. The periphery parts of the stack of two overlapped layers of the package 29 are heat-sealed.

Example

<Adjustment of Maximum Particle Diameter of Carbon Black>

Carbon black with a BET specific surface area of 64 m²/g was prepared as the conductive agent to be used for the positive electrode and the negative electrode. This carbon black was sieved using three kinds of sieves (sieve opening: 20 μm, 32 μm, and 45 μm). Each sieve was used for one sieving. Thus, three kinds of carbon black with the different maximum particle diameters were obtained in accordance with the value of the sieve opening.

<Formation of Positive Electrode>

As the positive electrode active material, lithium manganese oxide ($LiMn_2O_4$) with the maximum particle diameter ($D_{Max\_EC}$) shown in Table 1 was used. This positive electrode active material, one kind of carbon black selected from the three kinds of carbon black prepared in the above-described manner as the conductive agent, and polyvinylidene fluoride (PVDF, Kureha Battery Materials Japan Co., Ltd., #7200) as the binder resin were mixed at a solid content mass ratio of 93:3:4. The obtained mixture was added to a solvent, N-methyl-2-pyrrolidone (NMP). To this mixture, oxalic acid anhydrous (molecular weight: 90) as the organic moisture scavenger was added. The amount of added oxalic acid anhydrous was 0.03 parts by mass relative to 100 parts by mass of the solid content of the mixture excluding NMP. In addition, the mixture containing oxalic acid anhydrous was dispersed and mixed for 30 minutes by a planetary method, so that the above materials were uniformly dispersed in NMP. The thusly obtained slurry was applied on a 20-μm-thick aluminum foil serving as the positive electrode current collector with the use of a die coater. Next, the electrode was heated at 125° C. for 10 minutes to evaporate NMP; thus, the positive electrode active material layer was formed. In addition, by pressing the electrode, the positive electrode on which the positive electrode active material layer with the thickness shown in the table was applied was formed. Whether the linear mark or the groove is formed on the obtained positive electrode active material layer was checked visually.

<Formation of Negative Electrode>

As the negative electrode active material, graphite with the maximum particle diameter ($D_{Max\_EA}$) shown in Table 1 was used. This carbon material, one kind of carbon black selected from the three kinds of carbon black prepared in the above-described manner as the conductive agent, and one of PVDF and styrene butadiene copolymer latex (SBR) as the binder resin were mixed at a solid content mass ratio of 92:3:5. The resulting mixture was added to ion exchanged water and stirred, so that the materials were uniformly mixed and dispersed in the ion exchanged water. The thusly obtained slurry was applied on a 10-μm-thick copper foil serving as the negative electrode current collector with the use of a die coater. Next, the electrode was heated at 100° C. for 10 minutes, so that water was evaporated. Thus, the negative electrode active material layer was formed. In addition, the electrode was pressed; thus, the negative electrode on which the negative electrode active material layer with the thickness shown in the table was applied was formed. Whether the linear mark or the groove is formed on the obtained negative electrode active material layer was checked visually.

the aggregate at the preparation of the slurry. It is considered that this is because the graphite of the negative electrode active material and the carbon black as the conductive agent have relativity high affinity.

As described above, the electrode active material layer with the uniform surface can be formed by considering the balance between the maximum particle diameter of the electrode active material and the maximum particle diameter of the conductive agent as described above.

Example of the present disclosure has been described so far. The above Example merely expresses one example of the embodiment according to the present disclosure. The

TABLE 1

| Experiment No. | Electrode | Electrode active material $D_{Max}$ (μm) | Sieving process Done/Not done | Sieve opening (μm) 20 | 32 | 45 | Electrode active material layer thickness (μm) | Electrode linear mark Formed/Not formed |
|---|---|---|---|---|---|---|---|---|
| 1 | Positive | 22 | Not done | | | | 40 | Formed |
| 2 | electrode | 33 | Not done | | | | 65 | Formed |
| 3 | | 44 | Not done | | | | 85 | Formed |
| 4 | | 22 | Done | | | ● | 40 | Formed |
| 5 | | 33 | Done | | | ● | 65 | Formed |
| 6 | | 44 | Done | | | ● | 85 | Formed |
| 7 | | 22 | Done | | ● | | 40 | Formed |
| 8 | | 33 | Done | | ● | | 65 | Formed |
| 9 | | 44 | Done | | ● | | 85 | Not formed |
| 10 | | 22 | Done | ● | | | 40 | Not formed |
| 11 | | 33 | Done | ● | | | 65 | Not formed |
| 12 | | 44 | Done | ● | | | 85 | Not formed |
| 13 | Negative | 65 | Not done | | | | 80 | Formed |
| 14 | electrode | 48 | Not done | | | | 60 | Formed |
| 15 | | 40 | Not done | | | | 50 | Formed |
| 16 | | 65 | Done | | | ● | 80 | Formed |
| 17 | | 48 | Done | | | ● | 60 | Formed |
| 18 | | 40 | Done | | | ● | 50 | Formed |
| 19 | | 65 | Done | | ● | | 80 | Not formed |
| 20 | | 48 | Done | | ● | | 60 | Formed |
| 21 | | 40 | Done | | ● | | 50 | Formed |
| 22 | | 65 | Done | ● | | | 80 | Not formed |
| 23 | | 48 | Done | ● | | | 60 | Not formed |
| 24 | | 40 | Done | ● | | | 50 | Not formed |

The experiments according to Table 1 indicate that the maximum particle diameter ($D_{Max\_C}$) of the carbon black is smaller than the maximum particle diameter ($D_{Max\_E}$) of the electrode active material on the basis of the values of the sieve opening in Experiments 8 to 12, 16, 17, and 19 to 24. Among these experiments, in Experiments 9 to 12, 19, and 22 to 24, the linear mark was not observed on the surface of the electrode. In these experiments, it is considered that the giant particles of the carbon black were removed because the carbon black in the electrode active material mixture was sieved properly. On the other hand, it is considered that in Experiment 8, the giant particles of the carbon black larger than the maximum particle diameter (33 μm) of the electrode active material were not removed properly even if the separation was performed using the sieve with an opening of 32 μm. It is considered that the giant particles of the carbon black are not always spherical and some giant particles are long and thin in shape, and such long and thin particles passed the opening of the sieve. On the other hand, it is supposed that the reason why the linear mark was observed on the surface of the electrode in Experiments 16, 17, 20, and 21 is because the particles of the negative electrode active material with the maximum particle diameter ($D_{Max\_EA}$) and the particles of the carbon black with the maximum particle diameter after the sieving process formed above Example is not intended to limit the technical scope of the present disclosure to the particular embodiment or the specific structure.

The electrode for a lithium ion secondary battery according to the embodiment of the present disclosure may be the following first or second electrode for a lithium ion secondary battery.

The first electrode for a lithium ion secondary battery is an electrode for a lithium ion secondary battery, in which an electrode active material mixture for a lithium ion secondary battery, which includes an electrode active material, a conductive agent selected from carbon black, and a binder, is disposed on an electrode current collector, wherein the maximum particle diameter of the carbon black is smaller than the maximum particle diameter ($D_{Max\_E}$) of the electrode active material.

The second electrode for a lithium ion secondary battery is the first electrode for a lithium ion secondary battery, wherein the electrode active material mixture further includes a conductive agent selected from graphite and the maximum particle diameters of the electrode active material, the graphite, and the carbon black satisfy a relation of the electrode active material ($D_{Max\_E}$)>the graphite ($D_{Max\_G}$) >the carbon black.

The lithium ion secondary battery according to the present disclosure may be a lithium ion secondary battery wherein a power generating element including a positive electrode where a positive electrode active material mixture is disposed on a positive electrode current collector, a negative electrode where a negative electrode active material mixture is disposed on a negative electrode current collector, a separator, and an electrolyte solution is included in a package and at least the positive electrode or the negative electrode is the first or second electrode described above.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An electrode for a lithium ion secondary battery, comprising an electrode current collector where an electrode active material mixture for a lithium ion secondary battery is disposed to form an electrode active material layer, wherein
the electrode active material mixture for a lithium ion secondary battery includes an electrode active material, a conductive agent containing carbon black, and a binder; and
the electrode active material layer does not have a linear mark; and
a maximum particle diameter ($D_{Max\_C}$) of the carbon black is smaller than a maximum particle diameter ($D_{Max\_E}$) of the electrode active material.

2. The electrode for a lithium ion secondary battery according to claim 1, wherein
the conductive agent contains graphite.

3. A lithium ion secondary battery comprising a power generating element and a package, wherein
the power generating element includes a positive electrode, a negative electrode, a separator, and an electrolyte solution and is disposed in the package; and
at least one of the positive electrode and the negative electrode is the electrode for a lithium ion secondary battery according to claim 1.

4. The electrode for a lithium ion secondary battery according to claim 1, wherein maximum particle diameters of the electrode active material, the graphite, and the carbon black satisfy a relation of the electrode active material ($D_{Max\_E}$)>the graphite ($D_{Max\_G}$)>the carbon black ($D_{Max\_C}$).

5. The electrode for a lithium ion secondary battery according to claim 1, wherein the electrode active material is a positive electrode active material comprising lithium nickel composite oxide.

6. The electrode for a lithium ion secondary battery according to claim 5, wherein the lithium nickel composite includes oxide spinel lithium manganate or lithium manganite.

7. The electrode for a lithium ion secondary battery according to claim 5, wherein the binder comprises at least one selected from the group consisting of polyvinylidene fluoride (PVDF), polytetrafluoroethylene (PTFE), polyvinyl fluoride (PVF), polyanilines, polythiophenes, polyacetylenes, polypyrroles, styrene butadiene rubber (SBR), butadiene rubber (BR), chloroprene rubber (CR), isoprene rubber (IR), acrylonitrile butadiene rubber (NBR), carboxymethyl cellulose (CMC), xanthan gum, guar gum, and pectin.

8. The electrode for a lithium ion secondary battery according to claim 1, wherein the carbon black comprises acetylene black or Ketjen black.

9. The electrode for a lithium ion secondary battery according to claim 1, wherein the electrode active material is a positive electrode active material comprising lithium nickel composite oxide.

10. The electrode for a lithium ion secondary battery according to claim 9, wherein the lithium nickel composite includes oxide spinel lithium manganate or lithium manganite.

11. The electrode for a lithium ion secondary battery according to claim 9, wherein the binder comprises at least one selected from the group consisting of polyvinylidene fluoride (PVDF), polytetrafluoroethylene (PTFE), polyvinyl fluoride (PVF), polyanilines, polythiophenes, polyacetylenes, polypyrroles, styrene butadiene rubber (SBR), butadiene rubber (BR), chloroprene rubber (CR), isoprene rubber (IR), acrylonitrile butadiene rubber (NBR), carboxymethyl cellulose (CMC), xanthan gum, guar gum, and pectin.

12. The electrode for a lithium ion secondary battery according to claim 1, wherein the electrode comprises positive and negative electrode material layers.

13. An electrode for a lithium ion secondary battery, comprising an electrode current collector where an electrode active material mixture for a lithium ion secondary battery is disposed to form an electrode active material layer, wherein
the electrode active material mixture for a lithium ion secondary battery includes an electrode active material, a conductive agent containing carbon black, and a binder;
the electrode active material layer does not have a groove; and
a maximum particle diameter ($D_{Max\_C}$) of the carbon black is smaller than a maximum particle diameter ($D_{Max\_E}$) of the electrode active material.

14. The electrode for a lithium ion secondary battery according to claim 13, wherein the conductive agent contains graphite.

15. A lithium ion secondary battery comprising a power generating element and a package, wherein
the power generating element includes a positive electrode, a negative electrode, a separator, and an electrolyte solution and is disposed in the package; and
at least one of the positive electrode and the negative electrode is the electrode for a lithium ion secondary battery according to claim 13.

16. The electrode for a lithium ion secondary battery according to claim 13, wherein maximum particle diameters of the electrode active material, the graphite, and the carbon black satisfy a relation of the electrode active material ($D_{Max\_E}$)>the graphite ($D_{Max\_G}$)>the carbon black ($D_{Max\_C}$).

17. The electrode for a lithium ion secondary battery according to claim 13, wherein the carbon black comprises acetylene black or Ketjen black.

18. The electrode for a lithium ion secondary battery according to claim 13, wherein the electrode comprises positive and negative electrode material layers.

* * * * *